(12) United States Patent
Weaver et al.

(10) Patent No.: US 11,014,857 B2
(45) Date of Patent: May 25, 2021

(54) CONTACT INTERFACE FOR A COMPOSITE COMPONENT AND METHODS OF FABRICATION

(71) Applicant: General Electric Company, Schenectady, NY (US)

(72) Inventors: Matthew Mark Weaver, Loveland, OH (US); Chad Daniel Kleinow, Cincinnati, OH (US); Brian Jared Agnew, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 314 days.

(21) Appl. No.: 15/709,835

(22) Filed: Sep. 20, 2017

(65) Prior Publication Data

US 2019/0084890 A1 Mar. 21, 2019

(51) Int. Cl.
*C04B 35/80* (2006.01)
*B32B 18/00* (2006.01)
(Continued)

(52) U.S. Cl.
CPC ............ *C04B 35/806* (2013.01); *B32B 18/00* (2013.01); *C04B 35/571* (2013.01);
(Continued)

(58) Field of Classification Search
CPC ........ F01D 5/282; F01D 5/284; F01D 5/3007; F01D 5/30; F05D 2300/6012;
(Continued)

(56) References Cited

U.S. PATENT DOCUMENTS 5,573,377 A 11/1996 Bond et al.
7,306,826 B2 12/2007 Subramanian et al.
(Continued)

FOREIGN PATENT DOCUMENTS

CN 104685161 A 6/2015
EP 1 566 520 A2 8/2005
(Continued)

OTHER PUBLICATIONS

Extended European Search Report and Opinion issued in connection with corresponding EP Application No. 18192343.4 dated Feb. 5, 2019.
(Continued)

*Primary Examiner* — Camie S Thompson
(74) *Attorney, Agent, or Firm* — Dority & Manning, P.A.

(57) ABSTRACT

Composite components having structurally reinforced contact interfaces are provided. In one example, the component can include an inner laminate formed of one or more inner plies having reinforcement fibers oriented along a reference direction within a matrix material. The component can also include an interface laminated positioned on the inner laminate along at least a portion of a contact surface of the component. The interface laminate is formed of one or more interface plies having reinforcement fibers oriented along a direction offset from the reference direction within a matrix material. Methods for fabricating such components are also provided.

20 Claims, 7 Drawing Sheets

(51) Int. Cl.
  *C04B 35/571* (2006.01)
  *C04B 35/628* (2006.01)
  *C04B 35/645* (2006.01)
  *F01D 5/28* (2006.01)
  *F01D 5/30* (2006.01)

(52) U.S. Cl.
  CPC ...... *C04B 35/62863* (2013.01); *C04B 35/645* (2013.01); *F01D 5/282* (2013.01); *F01D 5/284* (2013.01); *F01D 5/30* (2013.01); *F01D 5/3007* (2013.01); *C04B 2235/428* (2013.01); *C04B 2235/5224* (2013.01); *C04B 2235/5228* (2013.01); *C04B 2235/5244* (2013.01); *C04B 2237/365* (2013.01); *F05D 2240/80* (2013.01); *F05D 2260/941* (2013.01); *F05D 2300/6012* (2013.01); *F05D 2300/6033* (2013.01)

(58) Field of Classification Search
  CPC ......... F05D 2300/6033; F05D 2240/80; F05D 2260/941; F05D 2200/32; F05D 2300/603; F05D 2300/6034; F05D 2300/2261; F05D 2300/702; F05D 2300/428; F05D 2300/5224; F05D 2300/5228; F05D 2300/5244; C04B 35/806; C04B 35/571; C04B 35/645; C04B 35/62863; C04B 2235/428; C04B 2235/5224; C04B 2235/5228; C04B 2237/365; C04B 2337/37; C04B 2337/76; C04B 2337/86; C04B 2111/00612; C04B 2237/66; C04B 2237/84; C04B 2235/5268; C04B 37/005; C04B 35/71; C04B 41/87; B32B 18/00; B32B 2315/02; B32B 15/12; B32B 5/12; Y02T 50/672; Y02T 50/673; B23P 15/02; B29C 73/04; B29L 2031/7504; F02F 7/0087; F23R 3/002; F05C 2253/16; F05C 2203/0817; B28B 1/002; Y10T 428/1317; Y10T 428/249929; F06D 2260/941; F06D 2240/80

USPC .................. 428/293.4, 428, 34.6; 416/229 R; 156/245

See application file for complete search history.

(56) References Cited

U.S. PATENT DOCUMENTS

| | | | |
|---|---|---|---|
| 8,424,921 | B2 | 4/2013 | Marlin et al. |
| 8,714,932 | B2 | 5/2014 | Noe et al. |
| 8,794,925 | B2 | 8/2014 | McCaffrey |
| 8,980,435 | B2 | 3/2015 | de Diego |
| 9,151,166 | B2 | 10/2015 | Uskert |
| 9,249,684 | B2 | 2/2016 | Lazur et al. |
| 9,598,965 | B2 | 3/2017 | Haje |
| 9,664,052 | B2 | 5/2017 | Delvaux et al. |
| 9,829,961 | B2 | 11/2017 | Le Hong |
| 10,370,986 | B2 | 8/2019 | Heitman et al. |
| 2007/0082201 | A1* | 4/2007 | Subramanian .......... F01D 5/282 428/408 |
| 2015/0176425 | A1 | 6/2015 | Caulfeild et al. |
| 2016/0230568 | A1 | 8/2016 | Sippel et al. |
| 2016/0245100 | A1 | 8/2016 | Luczak |

FOREIGN PATENT DOCUMENTS

| | | |
|---|---|---|
| EP | 2 423 440 A2 | 2/2012 |
| EP | 3 054 096 A1 | 8/2016 |
| JP | 2005/240797 A | 9/2005 |
| JP | 2017/025916 A | 2/2017 |

OTHER PUBLICATIONS

Machine Translated Japanese Office Action Corresponding to Application 2018167440 dated Dec. 27, 2019.

Chinese Search Report Corresponding to Application No. 201811091749 dated Oct. 26, 2020.

* cited by examiner

CONTACT INTERFACE FOR A COMPOSITE COMPONENT AND METHODS OF FABRICATION

FIELD

The present subject matter relates generally to composite components for gas turbine engines. More particularly, the present subject matter relates to composite components having structurally reinforced contact interfaces and methods for fabricating the same.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More commonly, non-traditional high temperature materials, such as ceramic matrix composite (CMC) materials, are being used for various components within gas turbine engines. For example, because CMC materials can withstand relatively extreme temperatures, there is particular interest in replacing components within the flow path of the combustion gases with CMC materials. In particular, rotor blades of the turbine section of the gas turbine engine are more commonly being formed of CMC materials.

CMC turbine rotor blades generally are formed from a plurality of plies of CMC material. Ideally, the plies utilize continuous CMC fibers, i.e., CMC fibers that are continuous along the length of the ply. Because CMC materials typically are strongest in the direction of the CMC fiber, turbine rotor blades utilizing continuous CMC fiber plies can better withstand stresses during operation of the turbine.

CMC rotor blades utilizing continuous fiber plies are often coupled with or connected to a turbine rotor disk. The surfaces of such CMC blades that contact or interface with the rotor disk are subjected to high contact stress and/or other stresses during operation of the gas turbine engine. As a result, the contact interfaces of such CMC blades typically wear faster than other portions of the blade.

In addition, during fabrication of such CMC blades, controlling the dimensions of such blades can be challenging. Thus, in some instances, additional material is added to the contact surfaces of the blades, the blades undergo a number of processes, and then are finish machined to form the blades to the desired geometry. In some instances, the added material includes continuous fiber plies that are laid up along the same direction as the underlying plies. While such plies can provide satisfactory structural integrity at the contact interfaces of such CMC blades, there is no readily apparent visual aid to ensure that the underlying plies have not been machined into and therefore compromised during the finish machining process. Moreover, when the fibers are oriented along the same direction, the plies can nest within one another, adding a further variable to controlling the dimensions of the blade. In other instances, the material added to the underlying plies has included a monolithic ceramic matrix material. While the monolithic ceramic matrix material can provide a visual aid for an operator to ensure the blade has not been over machined, such monolithic ceramic matrix materials positioned at the contact surfaces of such CMC blades has led to undesirable wear properties and crush capability of the blades.

Accordingly, a composite component having a structurally reinforced contact interface would be useful. In particular, a composite component having a structurally reinforced contact interface that can provide improved wear resistance, durability, and crush capability would be beneficial. Moreover, a composite component having a structurally reinforced contact interface that can provide a readily apparent visual aid to ensure the component has not been over machined would be advantageous.

BRIEF DESCRIPTION

Aspects and advantages of the invention will be set forth in part in the following description, or may be obvious from the description, or may be learned through practice of the invention.

In one exemplary aspect, the present disclosure is directed to a component. The component includes an inner laminate formed of one or more inner plies having reinforcement fibers embedded within a ceramic matrix material and oriented along a reference direction. The component also includes a contact interface comprising an interface laminate formed of one or more interface plies having reinforcement fibers embedded within a ceramic matrix material and oriented along a direction offset from the reference direction, wherein the outer laminate is positioned on the inner laminate.

In another exemplary aspect, the present disclosure is directed to a method for fabricating a contact interface for a component defining a reference direction. The component includes an inner laminate that includes one or more inner plies having reinforcement fibers embedded within a ceramic matrix material oriented along the reference direction. The method includes laying up one or more interface plies having reinforcement fibers embedded within a ceramic matrix material oriented along a direction offset from the reference direction, the one or more interface plies forming an interface laminate positioned on the inner laminate.

In another exemplary aspect, the present disclosure is directed to a turbine blade formed of a ceramic matrix material. The turbine blade includes a shank that includes a dovetail having a pressure side and a suction side opposite the pressure side, at least one of the pressure side and the suction side of the dovetail defining a contact surface. The turbine blade includes an inner laminate formed of one or more inner plies having reinforcement fibers oriented along the reference direction. The turbine blade also includes a contact interface that includes an interface laminate positioned on the inner laminate along at least a portion of the contact surface. The contact interface is formed of one or more interface plies that include one or more first plies and one or more second plies interspersed with the one or more first plies. The one or more first plies have reinforcement fibers oriented along a first direction with respect to the reference direction and the one or more second plies have reinforcement fibers oriented along a second direction with respect to the reference direction. The first direction is offset from the reference direction and the second direction is offset from the reference direction. The first direction is substantially perpendicular to the second direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
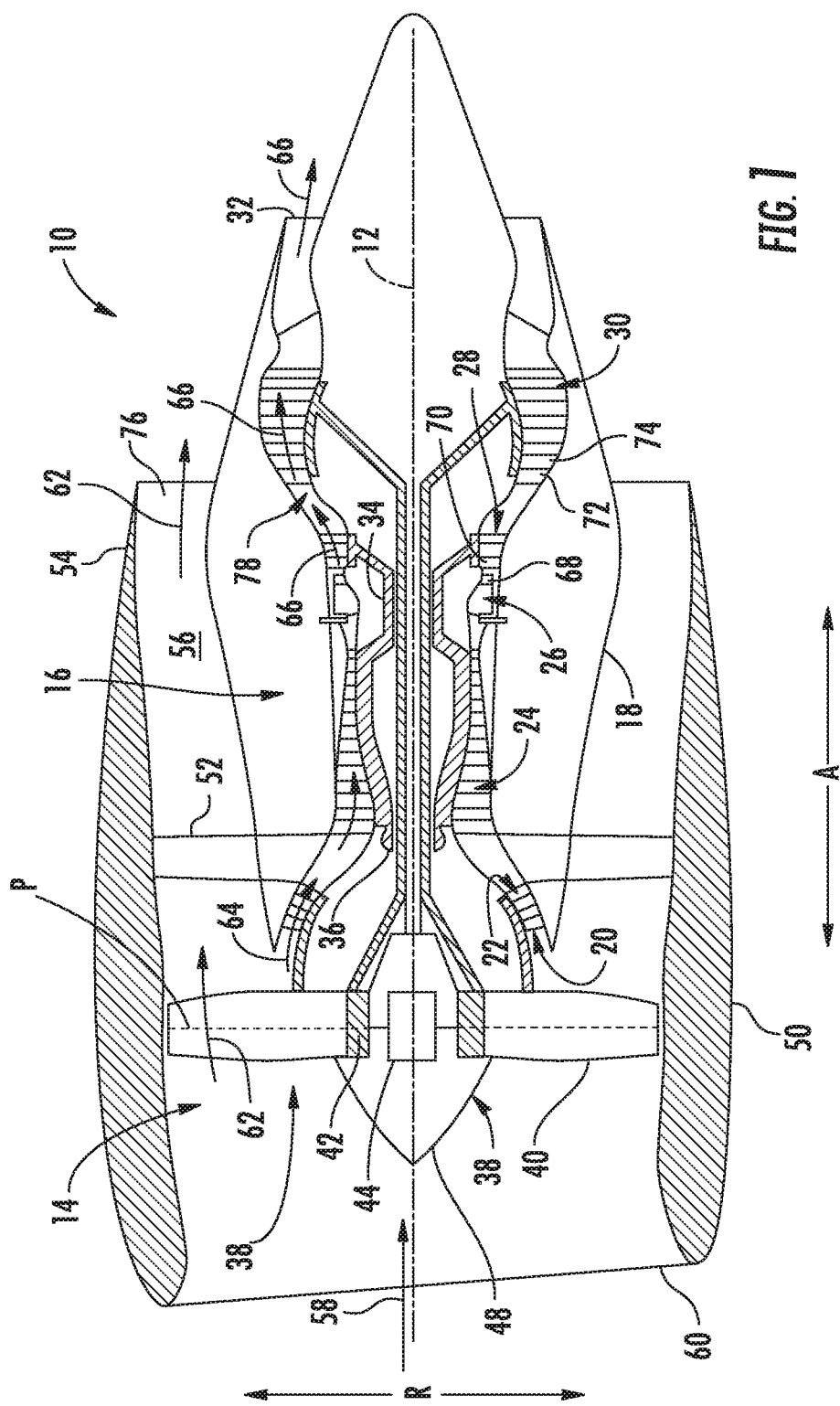
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. The term "about" when used in the context of angular position means within five degrees (5°) of the stated angle. For example, "about" ninety degrees (90°) means an angle within plus or minus five degrees (5°) of ninety degrees (90°). The term "substantially perpendicular" means within ten degrees (10°) of ninety degrees (90°).

Exemplary aspects of the present disclosure are directed to composite components for gas turbine engines that have structurally reinforced contact interfaces. Methods for fabricating such components are also provided. In one exemplary aspect, a component can include an inner laminate formed of one or more inner plies having reinforcement fibers oriented along a reference direction. The component also includes a structurally reinforced contact interface. The contact interface includes an interface laminate formed from one or more interface plies having reinforcement fibers oriented along a direction offset from the reference direction within a matrix material. The interface laminate is positioned on the inner laminate along at least a portion of a contact surface of the component. The resulting component has a wear resistant and durable contact interface. The offset fibers of the interface plies with respect to the fibers of the inner plies serve as a visual inspection aid. That is, after the component has been finish machined along the interface plies to shape the component to the desired geometry, the orientation of the visible fibers provides a readily apparent visual aid as to whether the underlying inner plies have been machined into.

Referring now to the drawings, wherein identical numerals indicate the same elements throughout the figures, FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10 can be formed of a composite material. In particular, components within hot gas path 78, such as components of combustion section 26, HP turbine 28, and/or LP turbine 30, can be formed of a ceramic matrix composite (CMC) material, which is a non-metallic material having high temperature capability. Exemplary CMC materials utilized for such composite components can include silicon carbide, silicon, silica, or alumina matrix materials and combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

During fabrication of such composite components, dimensional control can be challenging to achieve, particular where the component has a complex geometric shape, such as e.g., an airfoil. Moreover, dimensional control of the component is also particularly important along its contact surfaces, or surfaces of the component that interface with another component. To ensure the final composite component is shaped to desired specifications, interface plies can be added to the core of the component formed by structural inner plies (i.e., plies having a fiber reinforcement material embedded within a matrix material) prior to processing of the component, e.g., prior to compaction, burnout, and melt infiltration processes. In this way, after processing of the component, the machining plies can be grinded or otherwise finish machined such that the final component is shaped to desired specifications.

For instance, after the composite component is laid up with its underlying structural plies and outer interface plies, the laid-up component can undergo a compaction process, a burnout process, and a melt infiltrate process. More specifically, after the lay up process, the preform component can be processed in an autoclave to produce a compacted, green state component. Then, the green state component can be placed in a furnace to burn out excess binders or the like and then can be placed in a furnace with a piece or slab of silicon and fired to melt infiltrate the component with at least silicon. More particularly, heating (i.e., firing) the green state component in a vacuum or inert atmosphere decomposes the binders, removes the solvents, and converts the precursor to the desired pyrolyzed material. The decomposition of the binders results in a porous pyrolyzed body; the body may undergo densification, e.g., melt infiltration (MI), to fill the porosity. In one example, where the pyrolyzed component is fired with silicon, the component can undergo silicon melt-infiltration. However, densification can be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component.

Thereafter, the densified composite component is finish machined. For instance, the component can be grinded or otherwise machined, e.g., to bring the component within tolerance and to shape the component to the desired shape. During the finish machining process, the interface plies can be machined such that the component is formed to the desired shape. In some instances, the interface plies can remain as part of the final CMC component. In some other instances, the interface plies can partially remain as part of the final CMC component. It will be appreciated that other methods or processes of forming composite components can be used as well.

Figure 2:
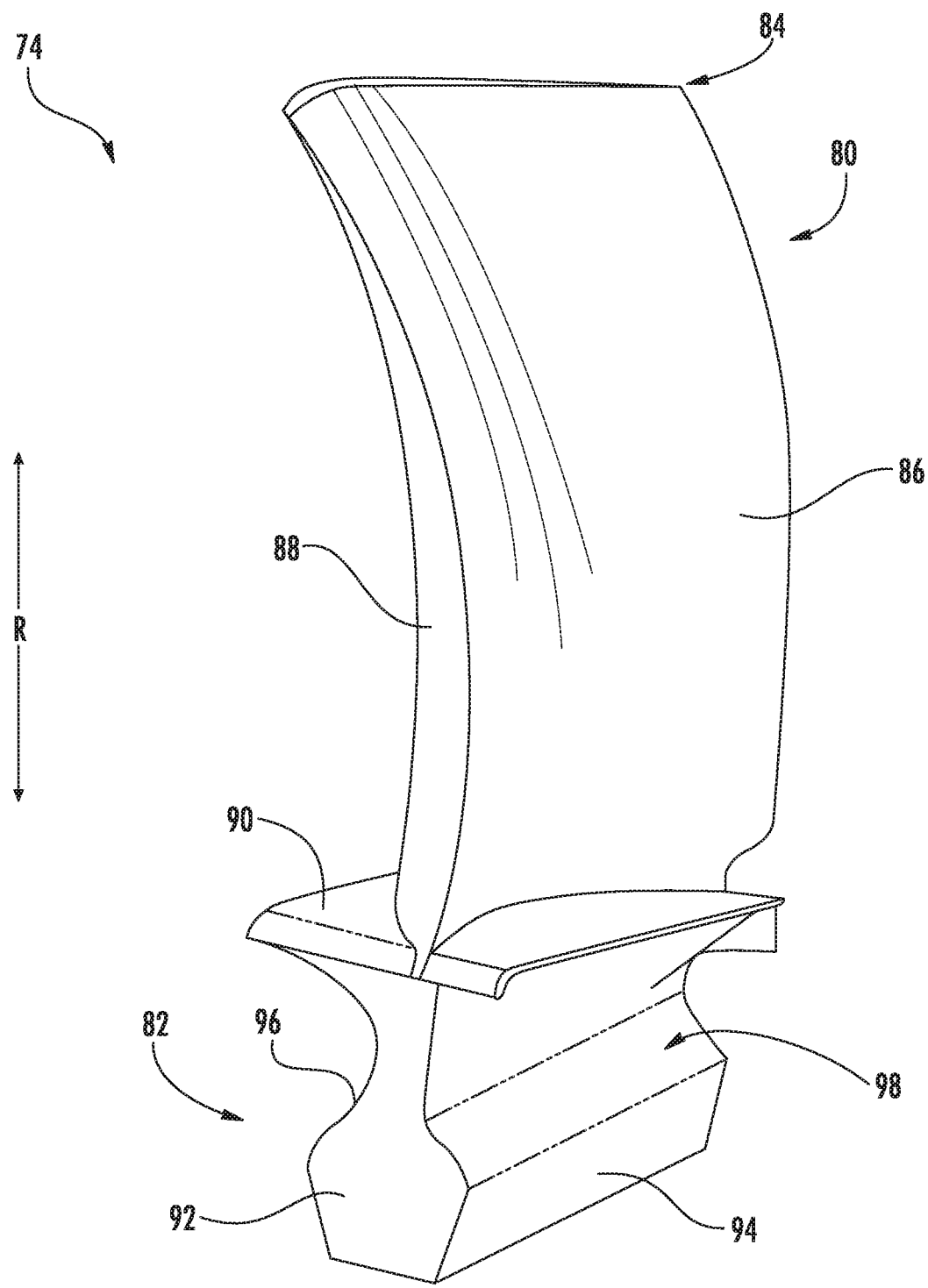
FIG. 2 provides a perspective view of a turbine blade of the gas turbine engine of FIG. 1.

FIG. 2 provides an exemplary composite component depicted as one of the LP turbine rotor blades 74 of the turbofan engine 10 of FIG. 1. Although the composite component is depicted as a turbine blade for use in a turbine blade assembly, in other exemplary embodiments, the composite component can be a blade configured for use in a fan blade assembly, a compressor blade assembly, or any other suitable application. In addition, the composite component can be other components of a gas turbine engine, such as e.g., one or more bands that define the flow path of the core turbine engine, a stator vane or airfoil of a nozzle assembly, a shroud, etc. Moreover, for this embodiment, the LP turbine blade 74 is formed from a CMC material, such as e.g., one of the exemplary CMC materials described above. Although blade 74 is depicted as being formed from a ceramic matrix material, in other exemplary embodiments, various composite components of a gas turbine engine can include other matrix materials, such as epoxy materials (e.g., for fans), polymer materials (e.g., for compressors), or any other suitable matrix material.

As illustrated in FIG. 2, the turbine blade 74 includes an airfoil 80 and a shank 82 fabricated from a plurality of plies of a CMC material. The airfoil 80 generally extends radially outward from shank 82 so as to project into the hot gas path 78 of the turbine section 30 (FIG. 1). For example, airfoil 80 can extend radially outwardly from shank 82 to an airfoil tip 84. The airfoil 80 generally defines an aerodynamic shape. As an example, the airfoil 80 can be shaped so as to have a pressure side 86 and a suction side 88 opposite the pressure side 86. The pressure side 86 and the suction side 88 are configured to facilitate the capture and conversion of the kinetic energy of the combustion gases 66 into usable rotational energy (FIG. 1).

As further shown in FIG. 2, the shank 82 includes a platform 90 and a dovetail 92. The root of the airfoil 80 is connected to the platform 90. Like the airfoil 80, the shank 82 includes a pressure side 94 and a suction side 96 opposite the pressure side 94. The turbine blade 74 can be mounted to a turbine rotor disk (not shown) by engaging the dovetail 92 within a slot of the rotor disk having a complementary geometry (not shown). Accordingly, the turbine blade 74 defines one or more contact surfaces 98. As used herein, a contact surface is any portion or face of a component that engages, mates, or otherwise contacts another component or part.

During operation of a gas turbine engine, various components of the engine contact or interface with one another. For example, the dovetail 92 of the turbine blade 74 of FIG. 2 interfaces with the turbine rotor disk. These contact surfaces of the blade are subjected to high contact, crush and/or other stresses during operation of the gas turbine engine. As a result, the contact surfaces typically wear faster than other portions of the component. In accordance with exemplary embodiments of the present subject matter as described more fully below, such components can be structurally reinforced at such contact surfaces.

Figure 3:
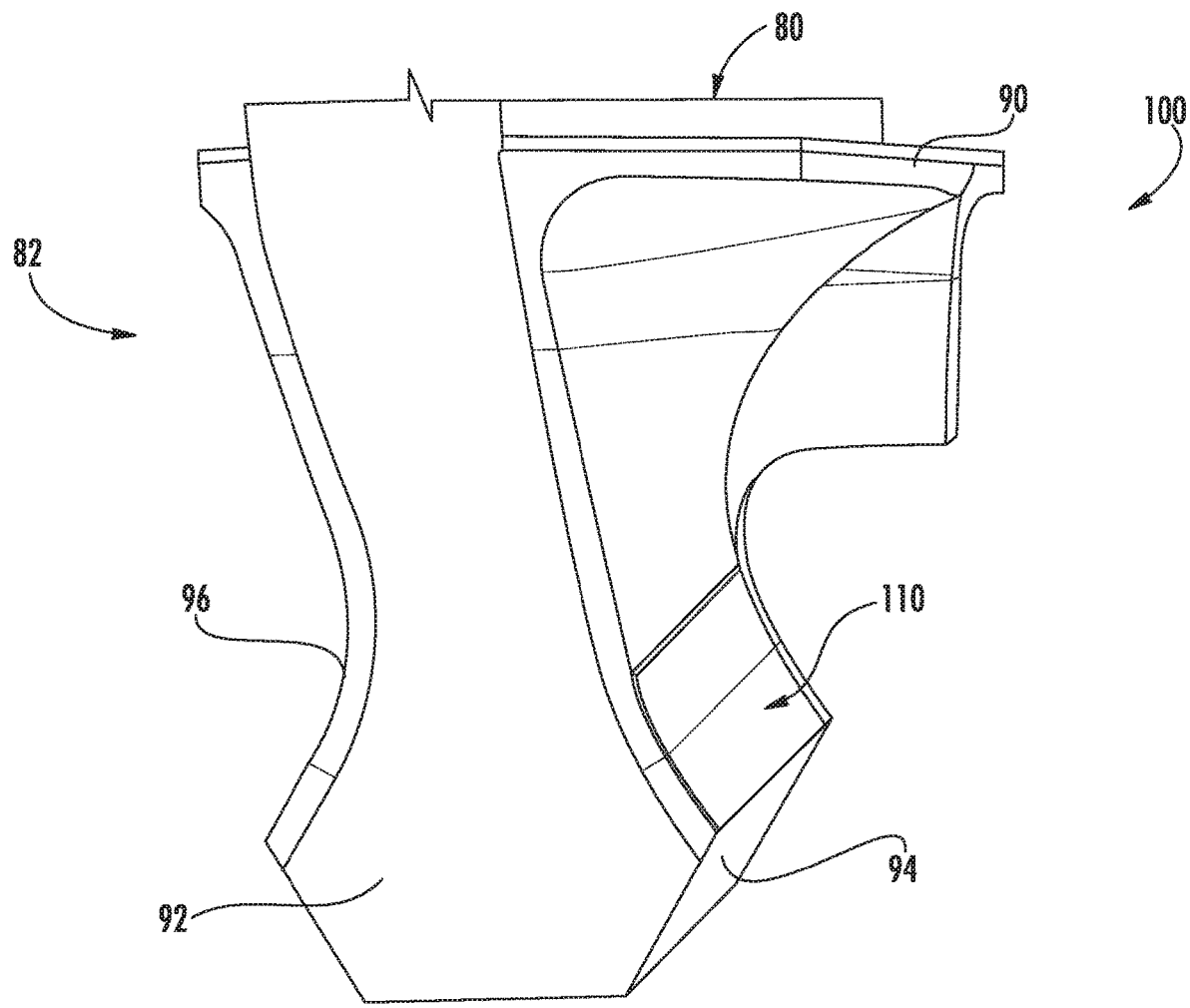
FIG. 3 provides a perspective view of an exemplary component formed of a composite material having a structurally reinforced contact interface according to an exemplary embodiment of the present subject matter.

FIG. 3 provides a close up perspective view of an exemplary component 100 formed of a composite material having a structurally reinforced contact interface 110. In this example, the component 100 is the LP turbine rotor blade 74 of FIG. 2 formed from a CMC material. As shown, the structurally reinforced contact interface 110 is positioned or located at one of the contact surfaces 98 (FIG. 2) of the turbine blade 74, which in this embodiment is one of the faces of the pressure side 94 of the dovetail 92. The structurally reinforced contact interface 110 positioned at the contact surface 98 can, among other things, provide increased crush capability and improved wear resistance along the contact surface 98 of the component 100. Moreover, the structurally reinforced contact interface 110 can provide a visual aid for quality purposes during fabrication of the component 100.

Figure 4:
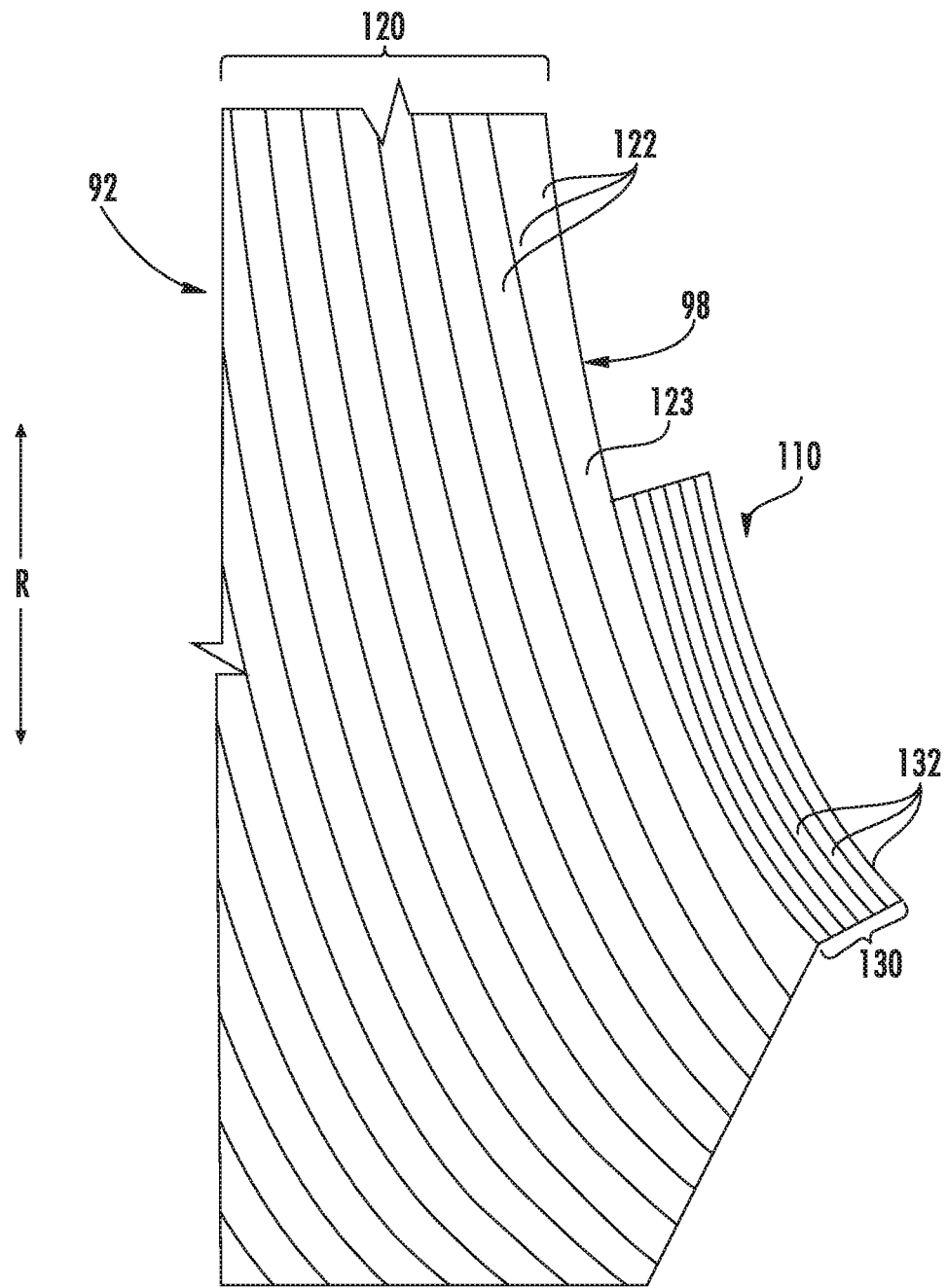
FIG. 4 provides a cross-sectional view of the structurally reinforced contact interface of the component of FIG. 3.

FIG. 4 provides a cross-sectional view of the structurally reinforced contact interface 110 of the component 100 of FIG. 3. More particularly, a cross section of the dovetail 92 of the turbine blade 74 depicted in FIG. 3 is illustrated. As shown in FIG. 4, the component 100 includes an inner laminate 120 formed of one or more inner plies 122. Each of the inner plies 122 include reinforcement fibers oriented within a matrix material, which in this embodiment is a ceramic matrix material. The inner plies 122 contain continuous CMC fibers along their lengths such that the continuous CMC fibers are oriented along the load direction. In this way, the stress loads on the component can be better propagated through the reinforcement fibers. In this embodiment, the load direction is generally along the radial direction R for contact surface 98.

The contact interface 110 of the component 100 includes an interface laminate 130 formed of one or more interface plies 132 having reinforcement fibers oriented within a matrix material. For this embodiment, the matrix material is a ceramic matrix material. As depicted, the interface laminate 130 is positioned on the inner laminate 120 at the contact surface 98. In some embodiments, the interface laminate 130 can be positioned directly on the inner laminate 120 as it is shown in FIG. 4. In other embodiments, the interface laminate 130 can be positioned indirectly on the inner laminate 120. For instance, an intermediate layer or laminate can be positioned between the interface laminate 130 and the inner laminate 120.

Figure 5:
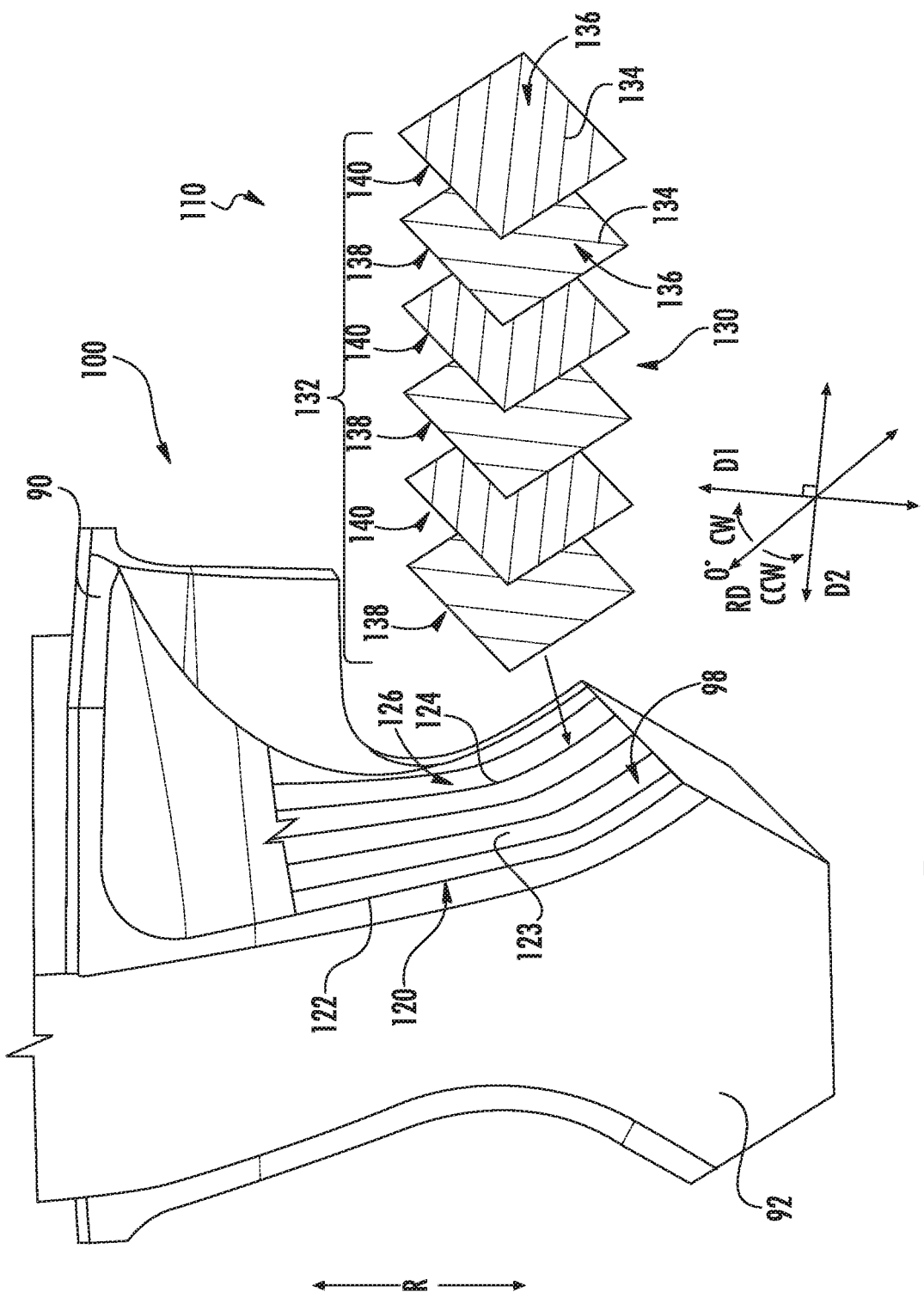
FIG. 5 provides an exploded view of an exemplary layup of an interface laminate for the contact interface of the component of FIG. 3.

FIG. 5 provides an exploded view of an exemplary lay up of the interface plies 132 for the contact interface 110 of the component 100 of FIG. 3. In FIG. 5, the surface of the component 100 has been cutaway to reveal an outer ply 123 of the inner plies 122 that form the inner laminate 120. As shown, the inner ply 122 has reinforcement fibers 124 oriented along a reference direction RD defined by the component 100 within a matrix material 126, which as noted above is a ceramic matrix material in this embodiment. More particularly, the reference direction RD is defined by the reinforcement fibers 124 along their lengths. The inner plies 122 contain continuous reinforcement fibers 124 along their lengths such that the fibers are oriented along the load direction, which in this embodiment is generally along the radial direction R for contact surface 98.

The interface plies 132 are shown in an exploded view in FIG. 5. As illustrated, the interface plies 132 have reinforcement fibers 134 oriented along a direction offset from the reference direction RD within a matrix material 136. More particularly, for this embodiment, the interface plies 132 of the interface laminate 130 include one or more first plies 138 and one or more second plies 140 interspersed with the first plies 138. For this embodiment, the reinforcement fibers 134 of the first plies 138 extend along a first direction D1 with respect to the reference direction RD and the reinforcement fibers 134 of the second plies 140 extend along a second direction D2 with respect to the reference direction RD. The first direction D1 is a different direction than the second direction D2.

For the depicted embodiment of FIG. 5, the first direction D1 is offset from the reference direction RD in the clockwise direction CW by forty-five degrees) (45°) (or three hundred fifteen degrees (315°) in the counterclockwise direction CCW) and the second direction D2 is offset from the reference direction RD in the clockwise direction CW by three hundred fifteen degrees (315°) (or forty-five degrees) (45°) in the counterclockwise direction CCW). In this way, the first direction D1 is offset from the second direction D2 by ninety degrees (90°). In some embodiments, the first direction D1 is offset from the second direction D2 by about ninety degrees) (90°). As used herein, the offset from the reference direction RD is determined as follows. The reference direction RD is a direction extending along the length of the fibers 124 of the inner plies 122. Using the reference direction RD as a zero degree) (0°) reference direction, the angular position with respect to the zero degree reference direction RD is the offset. In some embodiments, particularly where the inner plies 122 of the component 100 are formed of ply packs having fibers oriented along varying directions, the reference direction RD is defined along the length of the fibers of the outer ply 123 of the inner plies 122.

The first and second directions D1, D2 can be oriented in other suitable orientations with respect to the reference direction RD. For instance, in some embodiments, the first direction D1 is offset from the reference direction RD in the clockwise direction CW by about thirty degrees (30°) (or three hundred thirty degrees) (330°) in the counterclockwise direction CCW) and the second direction D2 is offset from the reference direction RD in the clockwise direction CW by three hundred degrees (300°) (or sixty degrees (60°) in the counterclockwise direction CCW). In this manner, the first direction D1 is offset from the second direction D2 by ninety degrees (90°). In some embodiments, the first direction D1 is substantially perpendicular to the second direction D2.

In some embodiments, to ensure that the fibers of the first and second plies 138, 140 cross the reference direction RD and each other. The reference direction RD defines a zero degree reference direction RD. In such embodiments, the first direction D1 is offset from the reference direction RD between zero degrees (0°) and ninety degrees (90°) (i.e., the first direction D1 extends between zero degrees (0°) and ninety degrees (90°) and between one hundred eighty degrees (180°) and two hundred seventy (270°)) and the second direction D2 is offset from the reference direction RD between ninety degrees (90°) and one hundred eighty degrees (180°) (i.e., the second direction D2 extends between ninety degrees (90°) and one hundred eighty degrees (180°) and between two hundred seventy (270°) and three hundred sixty (360°)). In this way, it is ensured that the fibers oriented along the first direction D1 and the fibers oriented along the second direction D2 cross each other as well as the fibers of the inner plies 122, which may provide for a more readily apparent visual aid after finish machining the component and prevents nesting of the plies, for example Advantageously, aside from the improved crush capability and wear resistance, by orienting the fibers of the first plies 138 in the first direction D1 and the fibers of the second plies 140 in the second direction D2, the orientation of the fibers can serve as a visual aid during inspection to ensure that the inner plies 122 of the inner laminate 120 have not been machined into when the component is finish machined to the desired geometry (i.e., that component 100 has not been over machined along the contact surface 98). That is, an operator or machine can readily determine if the underlying inner plies 122 have been machined into by noting the orientation of the fibers that are visible in the machined area. If the fibers are shown crisscrossing or oriented in a different orientation than the orientation of the underlying inner plies 122, then it can be determined that the component 100 has not been over machined in the contact surface area. On the other hand, if the fibers are shown oriented along the reference direction RD, then it can be determined that the component 100 has indeed been over machined in the contact surface area.

In some embodiments, to ensure the fibers 124 of the inner plies 122 and the fibers 134 of the interface plies 132 are readily distinguishable, the first direction D1 and the second direction D2 are each offset from the reference direction RD by at least twenty degrees (20°). This also ensures that the interface plies 132 do not nest or merge with the inner plies 122. Preventing nesting of the plies can provide improved dimensional control of the component as it is processed.

Figure 6:
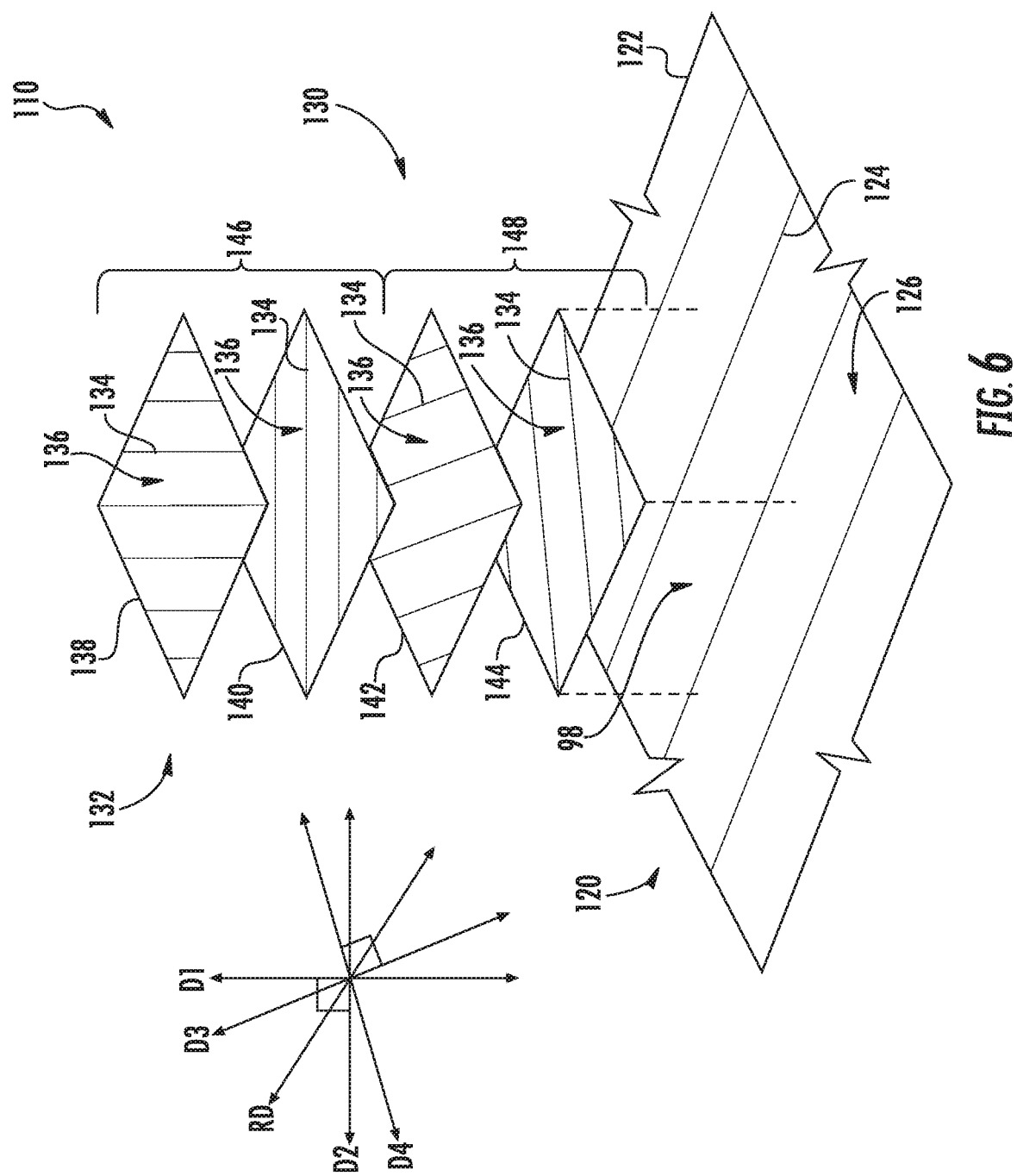
FIG. 6 provides an exploded view of an exemplary layup of interface plies for another exemplary contact interface of a composite component according to an exemplary embodiment of the present subject matter.

FIG. 6 provides an exploded view of an exemplary layup of interface plies 132 for another exemplary contact interface 110 for a composite component according to an exemplary embodiment of the present subject matter. As shown in FIG. 6, the inner laminate 120 includes one or more inner plies 122 (only one inner ply is shown in FIG. 6). The inner plies 122 have reinforcement fibers 124 oriented along the reference direction RD within matrix material 126. Moreover, for this embodiment, the interface laminate 130 includes a first layer 146 and a second layer 148 each including one or more interface plies 132. In particular, the one or more interface plies 132 of the first layer 146 include one or more first plies 138 and one or more second plies 140 interspersed with the first plies 138. The interface plies 132 of the second layer 148 include one or more third plies 142 and one or more fourth plies 144 interspersed with the one or more third plies 142. Only one fist ply 138, one second ply 140, one third ply 142, and one fourth ply 144 are shown in FIG. 6.

As further illustrated in FIG. 6, the reinforcement fibers 134 of the one or more first plies 138 extend along a first direction D1 with respect to the reference direction RD within matrix material 136 and the reinforcement fibers 134 of the one or more second plies 140 extend along a second direction D2 with respect to the reference direction RD within matrix material 136. For this embodiment, the fibers 134 of the first and second plies 138, 140 of the first layer 146 cross each other and the reference direction RD. In addition, the reinforcement fibers 134 of the one or more third plies 142 extend along a third direction D3 with respect to the reference direction RD within matrix material 136 and the reinforcement fibers 134 of the one or more fourth plies 144 extend along a fourth direction D4 with respect to the reference direction RD within matrix material 136. For this embodiment, the fibers 134 of the third and fourth plies 142, 144 of the second layer 148 cross each other and the reference direction RD.

More particularly, for this embodiment, the first direction D1 is offset from the reference direction RD in the clockwise direction CW by forty-five degrees) (45°) (or three hundred fifteen degrees (315°) in the counterclockwise direction CCW) and the second direction D2 is offset from the reference direction RD in the clockwise direction CW by three hundred fifteen degrees (315°) (or forty-five degrees) (45°) in the counterclockwise direction CCW). The third direction D3 is offset from the reference direction RD in the clockwise direction CW by thirty degrees (30°) (or three hundred thirty degrees (330°) in the counterclockwise direction CCW) and the fourth direction D4 is offset from the reference direction RD in the clockwise direction CW by three hundred degrees (300°) (or sixty degrees (60°) in the counterclockwise direction CCW). Thus, for this embodiment, the first direction D1 is offset from the second direction D2 by about ninety degrees (90°) and the third direction D3 is offset from the fourth direction D4 by about ninety degrees (90°). The fibers 134 of the plies 138, 140, 142, 144 are oriented in accordance with these directions as noted above.

By orienting the fibers of the first plies 138 in the first direction D1, the fibers of the second plies 140 in the second direction D2, the fibers of the third plies 142 in the third direction D3, and the fibers of the fourth plies 144 in the fourth direction D4, the orientation of the fibers can serve as a visual aid during inspection to ensure that the inner plies 122 of the inner laminate 120 have not been machined into when the component is machined to the desired geometry. Moreover, as the orientation of the fibers 134 change along the thickness of the interface laminate 130 (e.g. between the first layer 146 and the second layer 148), a further visual aid is provided. That is, not only can an operator or machine readily determine whether the underlying inner plies 122 have been machined into (i.e., over machined) during the finish machining process, the depth of the cut or the thickness of the resulting contact interface 110 can readily be determined. This may, for example, be particularly advantageous information if it is determined that the component requires further finish machining.

For instance, in this example, if only fibers oriented forty-five degrees) (45°) from the reference direction RD are visible after the finish machining process (i.e., the fibers 134 oriented along the first and second directions D1, D2), it can be readily determined that the underlying inner plies 122 of the inner laminate 120 have not been machined into and that the machined cut has only extended into the first layer 146 of the interface laminate 130. If fibers not oriented at forty-five degrees (45°) from the reference direction RD or fibers oriented along the reference direction RD are visible (i.e., fibers oriented at thirty degrees (30°) or three hundred degrees) (300°) from the reference direction RD), it can be readily determined that the underlying inner plies 122 of the inner laminate 120 have not been machined into and that the machined cut has extended into the second layer 148 of the interface laminate 130. Thus, there is a readily apparent visual aid as to the machined depth of the contact interface 110. Of course, if the fibers visible are oriented along the reference direction RD, then it can be readily determined that the component has been over machined in the contact surface area.

In some embodiments, preferably the first direction D1 is offset from the third direction D3 by at least ten degrees (10°) and that the second direction D2 is offset from the fourth direction D4 by at least ten degrees (10°) so as to make the difference between the layers of the interface laminate 130 more apparent. More preferably, the first direction D1 is offset from the third direction D3 by at least fifteen degrees (15°) and that the second direction D2 is offset from the fourth direction D4 by at least fifteen degrees (15°).

It will be appreciated that the interface laminate that forms the contact interface can have any suitable number of layers. For instance, the interface laminate can have a single layer or more than two layers. Each layer can have any suitable number of plies. In some embodiments, each layer can include plies having fibers extending along a first direction offset from the reference direction and plies having fibers extending along a second direction offset from the reference direction, as noted above. The plies can be interspersed. In some embodiments, the first and second plies having fibers extending in their respective directions can be interspersed in an alternating fashion. That is, the layer of plies can be laid up with a first ply, then a second ply, then a first ply, then a second ply as so on. In other embodiments, the first and second plies having fibers extending in their respective directions can be interspersed at intervals. For example, the layer of plies can be laid up with a first ply, then another first ply, then a second ply, and then another second ply, then a first ply, then another first ply, and so on. Preferably, the plies of the interface laminate are laid up in an alternating fashion. In this way, the plies are prevented from nesting or merging together during the compaction process. As noted previously, preventing nesting of the plies can provide improved dimensional control of the component as it is processed.

Figure 7:
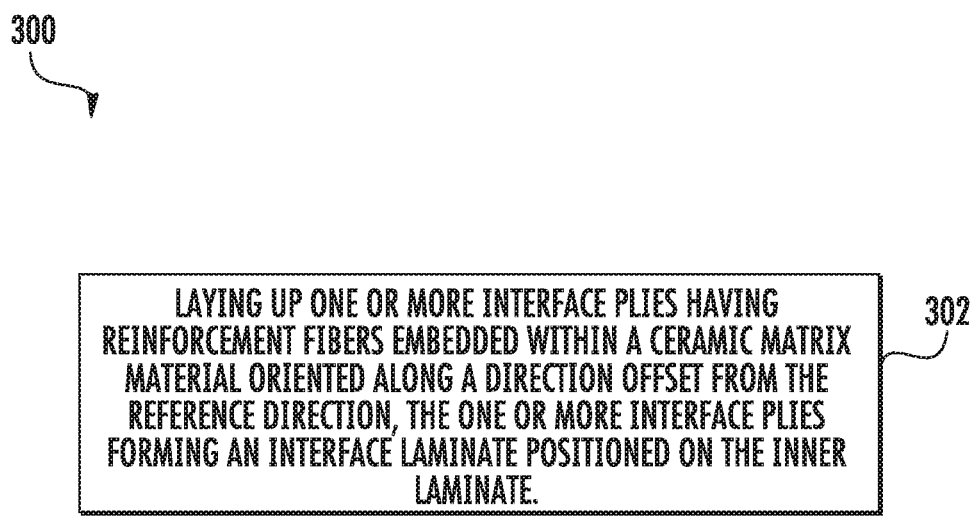
FIG. 7 provides a flow diagram of an exemplary method according to an exemplary embodiment of the present subject matter.

FIG. 7 provides a flow diagram of an exemplary method according to an exemplary embodiment of the present subject matter. In particular, FIG. 7 provides a flow diagram for a method for fabricating a contact interface for a component defining a reference direction. The component includes an inner laminate that includes one or more inner plies having reinforcement fibers oriented along the reference direction within a matrix material. For instance, the component can be the turbine rotor blade illustrated and described herein or another component of a gas turbine engine.

At (302), the method (300) includes laying up one or more interface plies having reinforcement fibers oriented along a direction offset from the reference direction, the one or more interface plies forming an interface laminate positioned on the inner laminate. For instance, the interface plies can be the interface plies 132 illustrated and described herein. The interface plies 132 can be laid up to form interface laminate 130 positioned on the inner laminate 120 along at least a portion of a contact surface of the component.

In one example implementation, the inner plies have reinforcement fibers oriented along the reference direction within a matrix material. In this example, the reference direction extends along the radial direction R. During laying up of the one or more interface plies 132, a single ply is laid up over the inner plies 122 along at least a portion of a contact surface of the component. The single ply has reinforcement fibers oriented along a direction offset from the reference direction within a matrix material. In this example, the direction is offset from the reference direction by forty-five degrees (45°), and thus, the reinforcement fibers of the single interface ply are offset from the reinforcement fibers of the inner plies by forty-five degrees (45°). In this way, the contact interface is structurally reinforced, and after the component is finish machined, the differently oriented reinforcement fibers of the interface ply can offer a visual aid during inspection. In some implementations, the direction is offset from the reference direction RD by at least forty-five degrees (45°). In some implementations, the direction is offset from the reference direction RD by about ninety degrees (90°). In some implementations, the direction is offset from the reference direction RD between about forty-five degrees (45°) and one hundred thirty-five degrees (135°).

In another example implementation, the inner plies have reinforcement fibers oriented along the reference direction within a matrix material. In this example, the reference direction extends along the radial direction R. The one or more interface plies 132 of the outer laminate 130 to be laid up include one or more first plies 138 and one or more second plies 140. In this example, the direction includes a first direction D1 and a second direction D2. The reinforcement fibers 134 of the one or more first plies 138 are oriented along the first direction D1 with respect to the reference direction RD within a matrix material 136 and the reinforcement fibers 134 of the one or more second plies 140 are oriented along the second direction D2 with respect to the reference direction RD. The first direction D1 is different than the second direction D2. In this manner, the reinforcement fibers 134 of the first plies 138 are offset from the reinforcement fibers 124 of the inner plies 120 in the first direction D1 and the reinforcement fibers 134 of the second plies 140 are offset from the reinforcement fibers 124 of the inner plies 120 in the second direction D2. Moreover, during laying up the one or more interface plies 132, the interface plies 132 are laid up such that the one or more first plies 138 are alternated with the one or more second plies 140. For instance, a first ply 138 can be laid up over one of the inner plies 122. The first ply 138 has reinforcement fibers 134 oriented along the first direction D1, which is a direction offset from the reference direction RD. Then, a second ply 140 can be laid up over the first ply 138. The second ply 140 has reinforcement fibers 134 oriented along the second direction D2, which is a direction offset from the reference direction RD and offset from the first direction D1. Thereafter, a first ply 138 can be laid up over the second ply 140, another second ply 140 can then be laid up, and so on until the desired thickness of the interface laminate 130 is achieved. In this way, the contact interface is structurally reinforced, and after the component is finish machined, the differently oriented reinforcement fibers of the first and second interface plies compared to the inner plies can offer a visual aid during inspection.

In one example implementation, the first direction D1 is offset from the reference direction RD by about forty-five degrees (45°) and the second direction D2 is offset from the reference direction RD by about three hundred fifteen degrees (315°). In this way, the fibers of the first plies 138 and the fibers of the second plies 140 crisscross each other in an X-like shape and also cross the reference direction RD. Moreover, in this example, the orientation of the fibers of the first plies 138, the second plies 140, and the inner plies 122 are spaced apart from one another so as to maximize the angular distance between them. This may prevent nesting of the plies and can provide a readily apparent visual aid after the component is finish machined, as described above. As another example implementation, the first direction D1 is offset from the reference direction RD by about thirty degrees (30°) and the second direction D2 is offset from the reference direction RD by about three hundred degrees) (300°). In both of these examples, the first direction D1 is offset from the second direction D2 by about ninety degrees (90°). This provides crisscrossing fibers and results in the interface plies 132 having an X-shape, which provides a readily apparent visual aid after the component is finish machined, as described above.

In some implementations, the reference direction RD defines a zero degree reference direction RD. In such implementations, the first direction D1 is offset from the reference direction RD between zero degrees (0°) and ninety degrees) (90°) (i.e., the first direction D1 extends between zero degrees (0°) and ninety degrees) (90°) and between one hundred eighty degrees (180°) and two hundred seventy)) (270°) and the second direction D2 is offset from the reference direction RD between ninety degrees (90°) and one hundred eighty degrees (180°) (i.e., the second direction D2 extends between ninety degrees (90°) and one hundred eighty degrees (180°) and between two hundred seventy (270°) and three hundred sixty (360°)). In this way, it is ensured that the fibers oriented along the first direction D1 and the fibers oriented along the second direction D2 cross each other as well as the fibers of the inner plies 122, which may provide for a more readily apparent visual aid after finish machining the component and prevents nesting of the plies, for example. In some implementations, the first direction is offset from the second direction by at least forty-five degrees (45°). In some implementations, the first direction D1 and the second direction D2 are each offset from the reference direction RD by at least twenty degrees (20°). In some implementations, the first direction D1 and the second direction D2 are each offset from the reference direction RD by at least thirty degrees (30°). The spacing of the fibers of such implementations provides for a more readily apparent visual aid and prevents nesting of the plies.

In some implementations, the direction includes a first direction, a second direction, a third direction, and a fourth direction. The first, second, third, and fourth directions are different directions. In such implementations, the outer laminate includes a first layer and a second layer each having one or more interface plies. The one or more interface plies of the first layer include one or more first plies and one or more second plies interspersed with the one or more first plies. The one or more interface plies of the second layer include one or more third plies and one or more fourth plies interspersed with the one or more third plies. In such implementations, the reinforcement fibers of the one or more first plies are oriented along the first direction with respect to the reference direction within a matrix material. The reinforcement fibers of the one or more second plies are oriented along the second direction with respect to the reference direction within a matrix material. The reinforcement fibers of the one or more third plies are oriented along the third direction with respect to the reference direction within a matrix material. Finally, the reinforcement fibers of the one or more fourth plies are oriented along a fourth direction with respect to the reference direction within a matrix material. In this way, not only can an operator or machine readily determine whether the underlying inner plies have been machined into (i.e., over machined) during the finish machining process, the depth of the cut or the thickness of the remaining interface plies can readily be determined.

In some implementations, the first direction, second direction, third direction, and fourth direction are offset from one another and the reference direction by at least ten degrees (10°). More preferably, the first direction, second direction, third direction, and fourth direction are offset from one another and the reference direction by at least twenty degrees (20°). More preferably still, the first direction, second direction, third direction, and fourth direction are offset from one another and the reference direction by at least thirty degrees (30°). In this way, the spacing of the fibers of such implementations provides for a more readily apparent visual aid and prevents nesting of the plies.

In some implementations, after laying up the one or more interface plies, the method further includes compacting the component; burning out the component; densifying the component; machining the component along at least a portion of the interface laminate; and determining the orientation of the reinforcement plies. For instance, in some embodiments, the component may be in the preform state when the interface plies are laid up onto the inner plies. After the interface plies are laid up, the resulting preform, which includes both inner plies and interface plies, undergoes a compaction process. For instance, the preform component can be inserted into an autoclave to form a green state component. Thereafter, the green state component can be subjected to a burnout process in which the green state component is placed in a furnace to burn out excess binders or the like. Then, the now porous component can undergo a densification process. For instance, the component can be placed in a furnace with a piece or slab of silicon and fired to melt infiltrate the component with at least silicon. The resulting composite component can then be finish machined along at least a portion of the interface laminate to machine the component to the desired geometry. After machining, the orientation of the visible fibers along the machined area are determined. If the fibers visible along the machined area are oriented along the reference direction, it can be determined that the underlying structural inner plies have been machined into and thus compromised. On the other hand, if the fibers visible along the machined area are not oriented along the reference direction, it can be determined that the underlying structural inner plies have not been machined into and thus are not compromised. Moreover, as the interface plies include reinforcement fibers embedded within a ceramic matrix, the contact interface is structurally reinforced. The contact interface can be particularly reinforced with alternating plies having fibers offset from one another and the underlying inner plies.

In some implementations, the component is damaged along its contact surface. In such implementations, the method includes: machining the damaged region. This can, for example, include removing interface plies, and in some instances, structural inner plies. Once the damaged region is removed, one or more interface plies can be laid up in a manner as described above at (302). Thereafter, the component and added interface plies can undergo a compaction process, which can include placing the component into an autoclave. The green state component can then be subjected to a burnout process and a melt infiltration process as described above. Then, the component can be finish machined along the interface plies to shape the component to the desired geometry. Thereafter, the component can be visually inspected such that the orientation of the fibers can be determined. Based on the orientation of the fibers, it can be readily determined whether the component has been over machined.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A component, comprising:
   an inner laminate formed of one or more inner plies having reinforcement fibers embedded within a ceramic matrix material and oriented along a reference direction, an outer ply of the one or more inner plies extending along a length; and
   a contact interface comprising an interface laminate formed of one or more interface plies having reinforcement fibers embedded within a ceramic matrix material and oriented along a direction offset from the reference direction, wherein the interface laminate is positioned on the inner laminate and each of the one or more interface plies have a length;
   wherein the one or more interface plies of the interface laminate comprise one or more first plies and one or more second plies interspersed with the one or more first plies in an alternating fashion, and wherein the direction comprises a first direction and a second direction, and wherein the reinforcement fibers of the one or more first plies are oriented along the first direction with respect to the reference direction and the reinforcement fibers of the one or more second plies are oriented along the second direction with respect to the reference direction;
   wherein the reference direction defines a zero degree reference direction, and wherein the first direction is offset from the reference direction between zero degrees (0°) and ninety degrees) (90° and the second direction is offset from the reference direction between ninety degrees (90°) and one hundred eighty degrees) (180°; and
   wherein the length of the outer ply of the one or more inner plies is greater than the length of each of the one or more interface plies.

2. The component of claim 1, wherein the reinforcement fibers of the one or more interface plies comprise silicon carbide fibers, and wherein the ceramic matrix material of the one or more interface plies comprises silicon carbide.

3. The component of claim 1, wherein the reinforcement fibers of the one or more inner plies comprise silicon carbide fibers, and wherein the ceramic matrix material of the one or more inner plies comprises silicon carbide.

4. The component of claim 1, wherein the first direction is offset from the second direction by about ninety degrees (90°).

5. The component of claim 1, wherein the first direction is offset from the second direction by at least forty-five degrees (45°).

6. The component of claim 1, wherein the first direction is offset from the reference direction by about forty-five degrees (45°) and the second direction is offset from the reference direction by about three hundred fifteen degrees (315°).

7. The component of claim 1, wherein the direction comprises a first direction, a second direction, a third direction, and a fourth direction, and wherein the interface laminate comprises a first layer and a second layer each comprised of the one or more interface plies, the one or more interface plies of the first layer comprising one or more first plies and one or more second plies interspersed with the one or more first plies and the one or more interface plies of the second layer comprising one or more third plies and one or more fourth plies interspersed with the one or more third plies, and wherein the reinforcement fibers of the one or more first plies are oriented along the first direction with respect to the reference direction within a ceramic matrix material and the reinforcement fibers of the one or more second plies are oriented along the second direction with respect to the reference direction within a ceramic matrix material and the reinforcement fibers of the one or more third plies are oriented along the third direction with respect to the reference direction within a ceramic matrix material and the reinforcement fibers of the one or more fourth plies are oriented along a fourth direction with respect to the reference direction within a ceramic matrix material, where the first, second, third, and fourth directions are different directions.

8. The component of claim 7, wherein the first direction is offset from the second direction by about ninety degrees (90°) and the third direction is offset from the fourth direction by about ninety degrees (90°).

9. The component of claim 7, wherein the first direction, the second direction, the third direction, and the fourth direction are offset from one another and the reference direction by at least ten degrees (10°).

10. The component of claim 1, wherein the component is a turbine blade of a gas turbine engine.

11. The component of claim 10, wherein the turbine blade comprises a shank comprising a dovetail, the dovetail having a pressure side and a suction side opposite the pressure side, and wherein a contact surface is defined by one of the pressure side and the suction side of the dovetail, and wherein the interface laminate is positioned on the inner laminate along at least a portion of the contact surface.

12. The component of claim 1, wherein the contact interface is only located on a contact surface of the component, the contact surface being a region that contacts or interfaces with another component.

13. A method for fabricating a contact interface for a component defining a reference direction, the component comprising an inner laminate comprised of one or more inner plies having reinforcement fibers embedded within a ceramic matrix material oriented along the reference direction, an outer ply of the one or more inner plies extending along a length, the method comprising:
laying up one or more interface plies having reinforcement fibers embedded within a ceramic matrix material oriented along a direction offset from the reference direction, the one or more interface plies forming an interface laminate positioned on the inner laminate, the one or more interface plies having a length;
wherein the one or more interface plies of the interface laminate comprise one or more first plies and one or more second plies interspersed with the one or more first plies in an alternating fashion, and wherein the direction comprises a first direction and a second direction, and wherein the reinforcement fibers of the one or more first plies are oriented along the first direction with respect to the reference direction and the reinforcement fibers of the one or more second plies are oriented along the second direction with respect to the reference direction;
wherein the reference direction defines a zero degree reference direction, and wherein the first direction is offset from the reference direction between zero degrees (0°) and ninety degrees) (90° and the second direction is offset from the reference direction between ninety degrees (90°) and one hundred eighty degrees) (180°; and
wherein the length of the outer ply of the one or more inner plies is greater than the length of each of the one or more interface plies.

14. The method of claim 13, wherein the first direction is offset from the second direction by about ninety degrees (90°).

15. The method of claim 13, wherein the direction comprises a first direction, a second direction, a third direction, and a fourth direction, and wherein the interface laminate comprises a first layer and a second layer each comprised of the one or more interface plies, the one or more interface plies of the first layer comprising one or more first plies and one or more second plies interspersed with the one or more first plies and the one or more interface plies of the second layer comprising one or more third plies and one or more fourth plies interspersed with the one or more third plies, and wherein the reinforcement fibers of the one or more first plies are embedded within a ceramic matrix material and oriented along the first direction with respect to the reference direction and the reinforcement fibers of the one or more second plies are embedded within a matrix material and oriented along the second direction with respect to the reference direction and the reinforcement fibers of the one or more third plies are embedded within a matrix material and oriented along the third direction with respect to the reference direction and the reinforcement fibers of the one or more fourth plies are embedded within a ceramic matrix material and oriented along a fourth direction with respect to the reference direction, where the first, second, third, and fourth directions are different directions.

16. The method of claim 13, wherein after laying up the one or more interface plies, the method further comprises:
compacting the component;
burning out the component;
densifying the component;
machining the component along at least a portion of the interface laminate; and
determining the orientation of the reinforcement plies.

17. The method of claim 13, wherein the component defines a contact surface, and wherein the interface laminate is positioned on the inner laminate along at least a portion of the contact surface.

18. The method of claim 13, wherein laying up one or more interface plies includes laying up the one or more interface plies only on a contact surface of the component, the contact surface being a region that contacts or interfaces with another component.

19. A turbine blade formed of a ceramic matrix material and comprising a shank comprising a dovetail having a pressure side and a suction side opposite the pressure side, at least one of the pressure side and the suction side of the dovetail defining a contact surface, the turbine blade comprising:
an inner laminate formed of one or more inner plies having reinforcement fibers embedded within a ceramic matrix material and oriented along the reference direction an outer ply of the one or more inner plies extending along a length; and
a contact interface comprising an interface laminate positioned on the inner laminate along at least a portion of the contact surface and formed of one or more interface plies having reinforcement fibers embedded within a ceramic matrix material, the one or more interface plies having a length;
wherein the one or more interface plies comprising one or more first plies and one or more second plies interspersed with the one or more first plies, wherein the one or more first plies have the reinforcement fibers oriented along a first direction with respect to the reference direction and the one or more second plies have the reinforcement fibers oriented along a second direction with respect to the reference direction, and wherein the first direction is offset from the reference direction and the second direction is offset from the reference direction, wherein the first direction is substantially perpendicular to the second direction;
wherein the one or more interface plies of the interface laminate comprise one or more first plies and one or more second plies interspersed with the one or more first plies in an alternating fashion, and wherein the direction comprises a first direction and a second direction, and wherein the reinforcement fibers of the one or more first plies are oriented along the first direction with respect to the reference direction and the reinforcement fibers of the one or more second plies are oriented along the second direction with respect to the reference direction;

wherein the reference direction defines a zero degree reference direction, and wherein the first direction is offset from the reference direction between zero degrees (0°) and ninety degrees) (90° and the second direction is offset from the reference direction between ninety degrees (90°) and one hundred eighty degrees) (180°; and wherein the length of the outer ply of the one or more inner plies is greater than the length of each of the one or more interface plies.

20. The turbine blade of claim 19, wherein the contact interface is only located on a contact surface of the component, the contact surface being a face of the pressure side of the dovetail.

* * * * *